(12) United States Patent
Kim et al.

(10) Patent No.: US 10,815,953 B2
(45) Date of Patent: Oct. 27, 2020

(54) METHOD FOR CONTROLLING MILD HYBRID VEHICLE

(71) Applicants: Hyundai Motor Company, Seoul (KR); Kia Motors Corporation, Seoul (KR)

(72) Inventors: YoungMin Kim, Yongin-si (KR); Ki Hong Kang, Gwangmyeong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 217 days.

(21) Appl. No.: 16/204,631

(22) Filed: Nov. 29, 2018

(65) Prior Publication Data

US 2019/0186452 A1 Jun. 20, 2019

(30) Foreign Application Priority Data

Dec. 18, 2017 (KR) .................... 10-2017-0174097

(51) Int. Cl.
*F02N 11/08* (2006.01)
*B60W 20/40* (2016.01)
*B60W 10/10* (2012.01)

(52) U.S. Cl.
CPC ......... *F02N 11/0837* (2013.01); *B60W 20/40* (2013.01); *B60W 2554/00* (2020.02); *B60W 2710/0627* (2013.01); *B60Y 2200/92* (2013.01); *F02N 2200/0801* (2013.01); *F02N 2200/123* (2013.01)

(58) Field of Classification Search
CPC ....... F02N 11/08; B60W 10/06; B60W 10/10; B60W 20/40
USPC .......................................................... 701/22
See application file for complete search history.

(56) References Cited

U.S. PATENT DOCUMENTS

| | | | |
|---|---|---|---|
| 8,936,531 B2 | 1/2015 | Sangameswaran et al. | |
| 2010/0025131 A1* | 2/2010 | Gloceri | B62D 21/11 180/65.28 |
| 2014/0235406 A1* | 8/2014 | Sangameswaran | B60W 10/06 477/99 |
| 2016/0096521 A1* | 4/2016 | Jang | B60W 10/26 701/22 |
| 2017/0043767 A1* | 2/2017 | Khafagy | B60W 30/16 |

* cited by examiner

*Primary Examiner* — Tan Q Nguyen
(74) *Attorney, Agent, or Firm* — Morgan, Lewis & Bockius LLP

(57) ABSTRACT

A method for controlling a mild hybrid vehicle may include receiving, by a controller, navigation information; determining, by the controller, whether a road on which the mild hybrid vehicle travels is in a dangerous area based on the navigation information; and releasing, by the controller, an idle stop and go state in which fuel supply to an engine of the mild hybrid vehicle is interrupted and the engine is stopped when the mild hybrid vehicle is stopped when it is determined that the road on which the mild hybrid vehicle travels is in the dangerous area.

8 Claims, 2 Drawing Sheets

METHOD FOR CONTROLLING MILD HYBRID VEHICLE

CROSS-REFERENCE TO RELATED APPLICATION

The present application claims priority to Korean Patent Application No. 10-2017-0174097 filed on Dec. 18, 2017, the entire contents of which is incorporated herein for all purposes by this reference.

BACKGROUND OF THE INVENTION

Field of the Invention

The present invention relates to a mild hybrid vehicle (or a mild hybrid electric vehicle), and more particularly, to a method for controlling a mild hybrid vehicle.

Description of Related Art

A hybrid electric vehicle utilizes both an internal combustion engine and a battery power source. The hybrid electric vehicle efficiently combines the torque of the internal combustion engine and the torque of a motor.

Hybrid electric vehicles may be categorized as either a hard type or a mild type according to a power sharing ratio between the engine and the motor. In the case of the mild type of hybrid electric vehicle (or a mild hybrid electric vehicle), a mild hybrid starter & generator (MHSG) configured to start the engine or generate electricity according to an output of the engine is used instead of an alternator. In the case of the hard type of hybrid electric vehicle, a driving motor configured for generating driving torque is used in addition to an integrated starter & generator (ISG) configured to start the engine or generate electricity.

The mild hybrid electric vehicle does not provide a driving mode in which torque of the MHSG is used for the main driving torque, but the MHSG may assist the torque of the engine according to the running state of the vehicle and may charge a battery (e.g., a 48 V battery) through regenerative braking. Accordingly, the fuel efficiency of the mild hybrid electric vehicle may be improved.

A related art may determine whether a current position of a vehicle is in a dangerous area when a driver of the vehicle changes a gear from a drive mode to another mode, and may immediately restart an engine when it is determined that the current position of the vehicle is in the dangerous area.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a method for controlling a mild hybrid vehicle which is configured for determine whether a road on which the mild hybrid vehicle travels is in a dangerous area based on dangerous area information (e.g., a railroad crossing or an intersection) set by a user in advance via navigation information or a terminal (e.g., a smart phone) of a driver of the mild hybrid vehicle and of preventing the mild hybrid vehicle from entering into an idle stop and go (ISG) state when the road is in the dangerous area to secure safety of the mild hybrid vehicle and increase a state of charge (SOC) value of a battery supplying electric power to a starter-generator of the mild hybrid vehicle.

An exemplary embodiment of the present invention may provide the method for controlling the mild hybrid vehicle, including: receiving, by a controller, navigation information; determining, by the controller, whether a road on which the mild hybrid vehicle travels is in a dangerous area based on the navigation information; and releasing, by the controller, an idle stop and go state in which fuel supply to an engine of the mild hybrid vehicle is interrupted and the engine is stopped when the mild hybrid vehicle is stopped when it is determined that the road on which the mild hybrid vehicle travels is in the dangerous area.

The method for controlling the mild hybrid vehicle may further include: determining, by the controller, whether a speed of the mild hybrid vehicle is less than a speed reference value. The controller may receive the navigation information when it is determined that the speed of the mild hybrid vehicle is less than the speed reference value.

The method for controlling the mild hybrid vehicle may further include: determining, by the controller, whether the mild hybrid vehicle passes through the dangerous area based on the navigation information. The controller may be configured to control the mild hybrid vehicle to enter into a driving mode in which the mild hybrid vehicle escapes from the released idle stop and go state when it is determined that the mild hybrid vehicle passes through the dangerous area.

Another exemplary embodiment of the present invention may provide the method for controlling the mild hybrid vehicle, including: receiving, by a controller, navigation information; determining, by the controller, whether a road on which the mild hybrid vehicle travels is in a dangerous area based on the navigation information; receiving, by the controller, idle stop and go state release information stored in a user device of a driver of the mild hybrid vehicle via communication with the user device when it is determined that the road on which the mild hybrid vehicle travels is in the dangerous area; and releasing, by the controller, an idle stop and go state in which fuel supply to an engine of the mild hybrid vehicle is interrupted and the engine is stopped when the mild hybrid vehicle is stopped when the idle stop and go state release information is received. The idle stop and go state release information may include information for releasing the idle stop and go state in the dangerous area.

The method for controlling the mild hybrid vehicle may further include: determining, by the controller, whether a speed of the mild hybrid vehicle is less than a speed reference value. The controller may receive the navigation information when it is determined that the speed of the mild hybrid vehicle is less than the speed reference value.

The method for controlling the mild hybrid vehicle may further include: determining, by the controller, whether the mild hybrid vehicle passes through the dangerous area based on the navigation information. The controller may be configured to control the mild hybrid vehicle to enter into a driving mode in which the mild hybrid vehicle escapes from the released idle stop and go state when it is determined that the mild hybrid vehicle passes through the dangerous area.

The method for controlling the mild hybrid vehicle according to the exemplary embodiment of the present invention may determine whether the road on which the mild hybrid vehicle travels is in the dangerous area based on the dangerous area information set by the user in advance via the navigation information or the terminal of the driver, and may prevent the mild hybrid vehicle from entering into the ISG state when the road is in the dangerous area to secure safety of the mild hybrid vehicle and to increase the SOC value of the battery.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
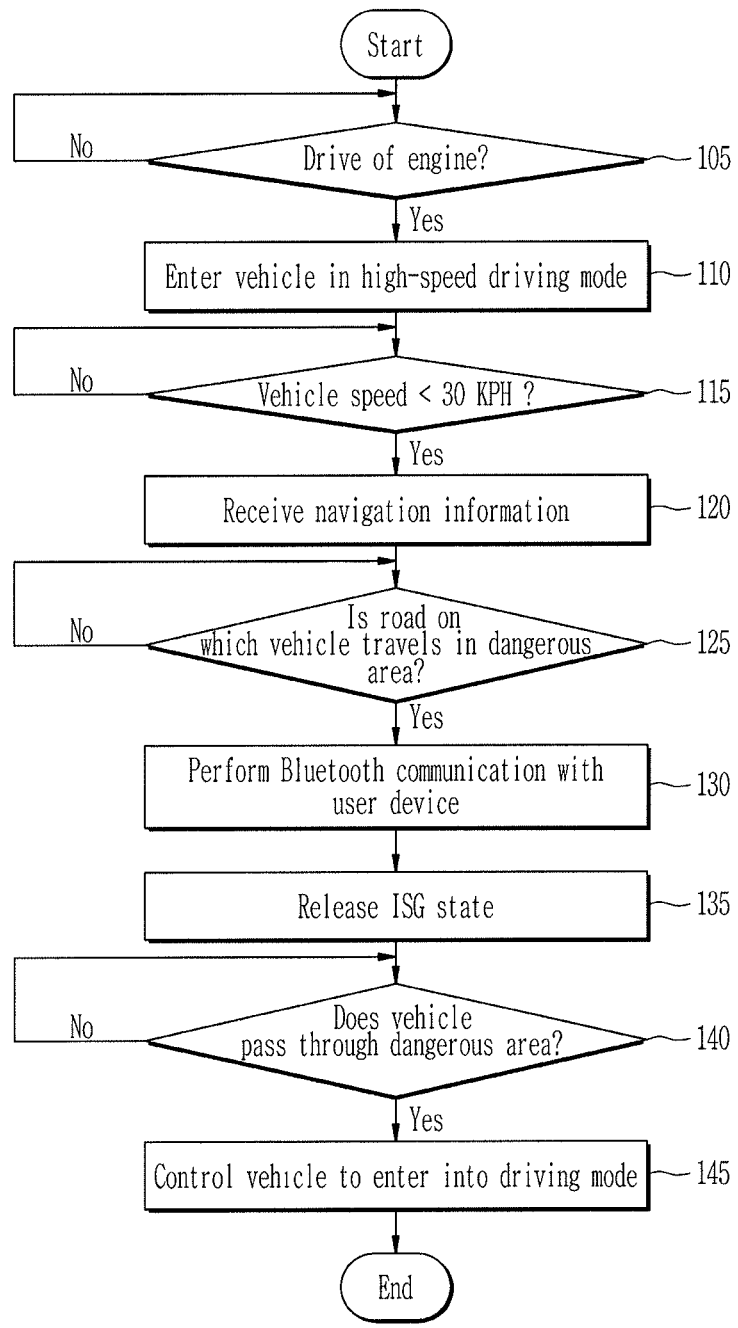
FIG. 1 is a flowchart illustrating a method for controlling a mild hybrid vehicle according to an exemplary embodiment of the present invention.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments of the present invention, it will be understood that the present description is not intended to limit the invention(s) to those exemplary embodiments. On the other hand, the invention(s) is/are intended to cover not only the exemplary embodiments of the present invention, but also various alternatives, modifications, equivalents and other embodiments, which may be included within the spirit and scope of the invention as defined by the appended claims.

To sufficiently understand the present invention and the object achieved by embodying the present invention, the accompanying drawings illustrating exemplary embodiments of the present invention and contents described in the accompanying drawings are to be referenced.

Hereinafter, the present invention will be described in detail by describing exemplary embodiments of the present invention with reference to the accompanying drawings. In describing the present invention, well-known configurations or functions will be omitted in detail since they may unnecessarily obscure the gist of the present invention. Throughout the accompanying drawings, the same reference numerals will be used to denote the same components.

Terms used in the exemplary embodiment are only used to describe specific exemplary embodiments rather than limiting the present invention. Singular forms are to include plural forms unless the context clearly indicates otherwise. It will be further understood that the terms "include" or "have" used in the exemplary embodiment specify the presence of features, numerals, steps, operations, components, or parts mentioned in the exemplary embodiment, or a combination thereof, but do not preclude the presence or addition of one or more other features, numerals, steps, operations, components, parts, or a combination thereof.

Throughout the present specification and the claims that follow, when it is described that an element is "coupled" to another element, the element may be "directly coupled" to the other element or "electrically or mechanically coupled" to the other element through a third element.

Unless defined otherwise, it is to be understood that the terms used in the exemplary embodiment including technical and scientific terms have the same meanings as those that are generally understood by those skilled in the art. It must be understood that the terms defined by the dictionary are identical with the meanings within the context of the related art, and they should not be ideally or excessively formally defined unless the context clearly dictates otherwise.

A related art may control a vehicle to perform an idle stop and go (ISG) function regardless of whether a road on which the vehicle travels is in a hazardous area, and thus may not immediately restart an engine in the hazardous area. Therefore, safety of the vehicle may not be secured.

Figure 2:
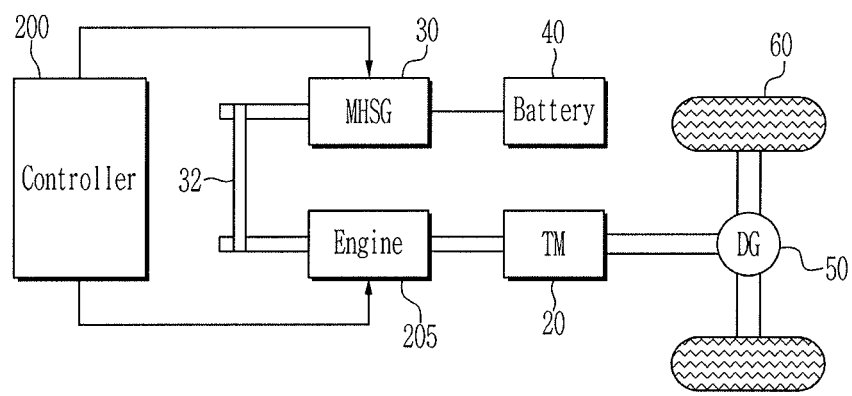
FIG. 2 is a block diagram illustrating a mild hybrid vehicle to which the method for controlling the mild hybrid vehicle shown in FIG. 1 is applied.

FIG. 1 is a flowchart illustrating a method for controlling a mild hybrid vehicle according to an exemplary embodiment of the present invention. FIG. 2 is a block diagram illustrating a mild hybrid vehicle to which the method for controlling the mild hybrid vehicle shown in FIG. 1 is applied.

Referring to FIG. 1 and FIG. 2, in a determination step 105, a controller 200 may determine whether the engine 205 is operated or driven. For example, whether the engine 205 is operated may be detected by an engine operation sensor disposed in the engine and may be provided to the controller 200.

The controller 200 may control an overall operation of the mild hybrid vehicle. For example, the controller 200 such as an engine control unit (ECU) may be one or more microprocessors operated by a program or hardware including the microprocessor. The program may include a series of commands for executing the method for controlling the mild hybrid vehicle according to the exemplary embodiment of the present invention. The commands may be stored in a memory.

The mild hybrid vehicle includes the engine 205, a transmission 20, the starter-generator (or the mild hybrid starter and generator) 30, the battery 40, a differential gear device 50, wheels 60, and the controller 200.

The engine 205 may convert chemical energy to mechanical energy by combusting fuel and air. Torque of the engine 205 may be transmitted to an input shaft of the transmission 20, and a torque output from an output shaft of the transmission may be transmitted to an axle of the vehicle via the differential gear device 50. The axle may rotate the wheels 60 so that the mild hybrid vehicle may be driven.

The starter-generator 30 may convert electrical energy to mechanical energy or mechanical energy to electrical energy. In other words, the starter-generator 30 may start the engine 205 or generate electricity according to an output of the engine 205. Furthermore, the starter-generator 30 may assist the torque of the engine 205. The mild hybrid vehicle may use the torque of the starter-generator 30 as an auxiliary power while combustion torque of the engine 205 is a main power. The engine 205 and the starter-generator 30 may be connected via the belt 32 (or a pulley and a belt).

In the mild hybrid vehicle, the starter-generator 30 may be a portion performing functions of an alternator, the engine torque assist, or regenerative braking.

The starter-generator 30 may drive the engine 205 of the vehicle in a cranking and a torque control mode of the vehicle (or the engine) and may generate electricity according to an output of the engine to charge the 48 V battery 40 using an inverter in an electricity generation mode of the vehicle. The starter-generator 30 may operate in an operating mode in accordance with a driving state of the vehicle. The operating mode may include an engine starting mode, an engine torque assist mode for assisting torque of the engine by operating as a motor, a mode for charging the 48 V battery charging the 12 V battery which is connected to the 48 V battery via the LDC, a regenerative braking mode for charging the 48 V battery, or an inertial driving mode for extending a mileage of the vehicle. The starter-generator 30 may be optimally controlled according to the driving state of the vehicle to increase fuel efficiency of the vehicle.

The battery 40 may supply electricity to the starter-generator 30 or may be charged by electricity collected through the starter-generator 30 in a regenerative braking mode of the vehicle. The battery 40 may be a 48 V battery. The mild hybrid vehicle may further include a low voltage DC-DC converter (LDC) that converts voltage supplied from the battery 40 to a low voltage and a 12 V battery that supplies the low voltage to an electric load of the vehicle.

According to a step 110, when the engine 205 is operated, the controller 200 may control the engine 205 (or the engine and the start generator 30) so that the mild hybrid vehicle enters a high-speed driving mode. In another exemplary embodiment of the present invention, the step 110 may be omitted.

According to a step 115, the controller 200 may determine whether a speed of the mild hybrid vehicle is less than a speed reference value (e.g., 30 kilometers per hour (KPH)) after the high-speed driving mode of the mild hybrid vehicle. The speed of the mild hybrid vehicle may be detected by a speed sensor of the vehicle and may be provided to the controller 200. The speed sensor may be mounted on a wheel 60 of the vehicle.

According to a step 120, the controller 200 may receive navigation information when it is determined that the speed of the mild hybrid vehicle is less than the speed reference value. For example, the navigation information may be received by a transceiver of the mild hybrid vehicle and may be provided to the controller 200. The navigation information may be provided to the transceiver by a server disposed outside the mild hybrid vehicle.

According to a determination step 125, the controller 200 may determine whether a road on which the mild hybrid vehicle travels is in a dangerous area based on the navigation information. For example, the dangerous area may be a road congestion area such as a railroad crossing or an intersection.

According to a step 130, when it is determined that the road on which the mild hybrid vehicle travels is in the dangerous area, the controller 200 may receive idle stop and go (ISG) state release information stored in a user device (e.g., a smartphone) of a driver of the vehicle through communication (e.g., near field communication such as Bluetooth communication). The ISG state release information may include information for releasing the ISG state of the vehicle in the dangerous area.

According to a step 135, when the controller 200 receives the ISG state release information stored in the user device via communication with the user device of the vehicle driver, the controller 200 may release the ISG state in which fuel supply to the engine 205 is interrupted and the engine is stopped when the mild hybrid vehicle is stopped. Accordingly, the ISG state may be effectively released in the dangerous area according to a will of the driver of the vehicle in the step 130, so that the exemplary embodiment of the present invention restarts the engine 205 in the dangerous area to prevent an accident of the vehicle.

The controller 200 may perform an idle stop and go (ISG) function to enter the mild hybrid vehicle into the ISG state. The ISG function may mean a function that stops the engine 205 to prevent the engine from operating when the vehicle stops and drives the engine again to enable the vehicle to move when the vehicle starts. In more detail, the ISG function may mean a function that automatically stops the engine 205 by preventing fuel injection from being applied in the engine when the vehicle stops while the vehicle is running and automatically restarts the engine by a starter-generator 30 when the vehicle restarts in the stopped state (e.g., when a driver of the vehicle releases a brake pedal and depresses an acceleration pedal).

In another exemplary embodiment of the present invention, the step 130 may be omitted. When it is determined in the determination step 125 that the road on which the mild hybrid vehicle travels is in the dangerous area, the controller 200 may release the ISG state of the mild hybrid vehicle. Thus, the exemplary embodiment of the present invention may restart the engine 205 in the dangerous area.

According to a determination step 140, the controller 200 may determine whether the mild hybrid vehicle passes through the dangerous area based on the navigation information or the ISG state release information through communication with the user device. For example, when the dangerous area information is not included in the navigation information or when the ISG state release information is not received through communication between the user device and the controller 200, the controller 200 may determine that the mild hybrid vehicle passes through the dangerous area.

According to a step 145, when it is determined that the mild hybrid vehicle passes through the dangerous area, the controller 200 may control the mild hybrid vehicle to enter into a driving mode in which the mild hybrid vehicle escapes from the released ISG state.

The components, "~unit", block, or module which are used in the present exemplary embodiment of the present invention may be implemented in software such as a task, a class, a subroutine, a process, an object, an execution thread, or a program which is performed in a predetermined region in the memory, or hardware such as a field programmable gate array (FPGA) or an application-specific integrated circuit (ASIC), and may be performed with a combination of the software and the hardware. The components, '~part', or the like may be embedded in a computer-readable storage medium, and some portion thereof may be dispersedly distributed in a plurality of computers.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method for controlling a mild hybrid vehicle, the method comprising:
   receiving, by a controller, navigation information;
   determining, by the controller, when a road on which the mild hybrid vehicle travels is in a dangerous area based on the navigation information; and
   releasing, by the controller, an idle stop and go state in which fuel supply to an engine of the mild hybrid vehicle is interrupted and the engine is stopped when the mild hybrid vehicle is stopped while it is determined by the controller that the road on which the mild hybrid vehicle travels is in the dangerous area.

2. The method of claim 1, further including:
   before the controller receives the navigation information, determining, by the controller, when a speed of the mild hybrid vehicle is less than a speed reference value,
   wherein the controller is configured to receive the navigation information when it is determined by the controller that the speed of the mild hybrid vehicle is less than the speed reference value.

3. The method of claim 2, further including:
   after the controller receives the navigation information, determining, by the controller, when the mild hybrid vehicle passes through the dangerous area based on the navigation information,
   wherein the controller is configured to control the mild hybrid vehicle to enter into a driving mode in which the mild hybrid vehicle escapes from the released idle stop and go state when it is determined by the controller that the mild hybrid vehicle passes through the dangerous area.

4. The method of claim 1, further including:
   determining, by the controller, when the mild hybrid vehicle passes through the dangerous area based on the navigation information,
   wherein the controller is configured to control the mild hybrid vehicle to enter into a driving mode in which the mild hybrid vehicle escapes from the released idle stop and go state when it is determined by the controller that the mild hybrid vehicle passes through the dangerous area.

5. A method for controlling a mild hybrid vehicle, the method comprising:
   receiving, by a controller, navigation information;
   determining, by the controller, when a road on which the mild hybrid vehicle travels is in a dangerous area based on the navigation information;
   receiving, by the controller, idle stop and go state release information stored in a user device of a driver of the mild hybrid vehicle via communication with the user device when it is determined by the controller that the road on which the mild hybrid vehicle travels is in the dangerous area; and
   releasing, by the controller, an idle stop and go state in which fuel supply to an engine of the mild hybrid vehicle is interrupted and the engine is stopped when the mild hybrid vehicle is stopped while the idle stop and go state release information is received,
   wherein the idle stop and go state release information includes information for releasing the idle stop and go state in the dangerous area.

6. The method of claim 5, further including:
   before the controller receives the navigation information, determining, by the controller, when a speed of the mild hybrid vehicle is less than a speed reference value,
   wherein the controller is configured to receive the navigation information when it is determined by the controller that the speed of the mild hybrid vehicle is less than the speed reference value.

7. The method of claim 6, further including:
   after the controller releases the idle stop and go state, determining, by the controller, when the mild hybrid vehicle passes through the dangerous area based on the navigation information,
   wherein the controller is configured to control the mild hybrid vehicle to enter into a driving mode in which the mild hybrid vehicle escapes from the released idle stop and go state when it is determined by the controller that the mild hybrid vehicle passes through the dangerous area.

8. The method of claim 5, further including:
   after the controller releases the idle stop and go state, determining, by the controller, when the mild hybrid vehicle passes through the dangerous area based on the idle stop and go state release information,
   wherein the controller is configured to control the mild hybrid vehicle to enter into a driving mode in which the mild hybrid vehicle escapes from the released idle stop and go state when it is determined by the controller that the mild hybrid vehicle passes through the dangerous area.

* * * * *